(12) United States Patent
Lin

(10) Patent No.: US 9,593,675 B2
(45) Date of Patent: Mar. 14, 2017

(54) SELF-POWERED PUMP FOR HEATED LIQUID AND HEAT DRIVEN LIQUID CLOSE-LOOP AUTOMATIC CIRCULATING SYSTEM EMPLOYING SAME

(76) Inventor: Huazi Lin, Richmond Hill (CA)

( * ) Notice: Subject to any disclaimer, the term of this patent is extended or adjusted under 35 U.S.C. 154(b) by 815 days.

(21) Appl. No.: 13/502,235

(22) PCT Filed: Aug. 23, 2010

(86) PCT No.: PCT/CA2010/001297
§ 371 (c)(1),
(2), (4) Date: Apr. 16, 2012

(87) PCT Pub. No.: WO2011/029174
PCT Pub. Date: Mar. 17, 2011

(65) Prior Publication Data
US 2012/0244017 A1 Sep. 27, 2012

(30) Foreign Application Priority Data
Sep. 8, 2009 (CA) ..................... 2678584

(51) Int. Cl.
*F04B 19/24* (2006.01)
*F04B 17/00* (2006.01)
(Continued)

(52) U.S. Cl.
CPC .......... *F04B 17/006* (2013.01); *F24D 11/003* (2013.01); *F24D 19/082* (2013.01);
(Continued)

(58) Field of Classification Search
CPC ...... F04B 17/006; F04B 43/026; F04B 43/06; F04B 47/08; F04B 9/12; Y02B 10/20;
Y02B 10/70; F24D 2200/14; F24D 17/0021; F24D 2220/06; F24D 2220/08; F24D 11/003; F24D 2240/10; F24D 2240/12; F24D 19/0092; F24D 19/082; F24D 19/1057; F24J 2/463; F24J 2/12; F24J 2/32; F24J 2/345; F24J 2/4627; F24J 2002/4603; F24J 2/07; F24J 2/20; F24J 2/42; F24J 2/44;
(Continued)

(56) References Cited

U.S. PATENT DOCUMENTS 2,230,917 A * 2/1941 Triana ................... F04B 17/006
122/451 R
2,688,922 A * 9/1954 Bonaventura ......... F04B 17/006
126/684

(Continued)

*Primary Examiner* — Dominick L Plakkoottam
(74) *Attorney, Agent, or Firm* — WPAT, PC; Justin King

(57) ABSTRACT

A heat driven liquid close-loop automatic circulating system is provided. This system circulates the liquid in a close-loop by the collected heat in the loop. The system may operate without external power for the pump. The heat driven liquid close-loop automatic circulating system may employ a modified self-powered pump for heated liquid. The pump includes an airtight container for containing the heated liquid, a inlet and a outlet of the heated liquid, further more the modified self-powered pump has a breathing channel with a liquid vapor condensing and reflux structure. The heat driven liquid close-loop automatic circulating system may be a solar heated liquid close-loop automatic circulating system with a solar heat collector.

12 Claims, 8 Drawing Sheets

(51) Int. Cl.
  *F24J 2/46* (2006.01)
  *F24D 11/00* (2006.01)
  *F24D 19/10* (2006.01)
  *F24D 19/08* (2006.01)
  *F24J 2/32* (2006.01)
  *F04B 43/06* (2006.01)
  *F24J 2/34* (2006.01)
  *F24J 2/42* (2006.01)

(52) U.S. Cl.
  CPC ............ *F24D 19/1057* (2013.01); *F24J 2/32* (2013.01); *F24J 2/463* (2013.01); *F24J 2/4627* (2013.01); *F04B 43/06* (2013.01); *F24D 2200/14* (2013.01); *F24J 2/345* (2013.01); *F24J 2/42* (2013.01); *Y02B 10/20* (2013.01)

(58) Field of Classification Search
  CPC ........ F24J 2/4607; F24J 2/4621; F24J 2/4634; F24H 9/124; F24H 1/208; F28D 2020/0078; F28D 2020/0069; F28D 2020/0086; F28D 20/0034; F28D 20/0039; F28F 2250/08; Y10T 137/27; Y10T 137/272; Y10T 137/2788; Y10T 137/2931; Y10T 137/2934; Y10T 137/313; Y10T 137/7882
  See application file for complete search history.

(56) References Cited

U.S. PATENT DOCUMENTS

| | | | | |
|---|---|---|---|---|
| 2,688,923 | A * | 9/1954 | Bonaventura | F03G 6/06 126/569 |
| 3,112,862 | A * | 12/1963 | Sherock | F03G 6/00 417/379 |
| 4,197,060 | A * | 4/1980 | Chadwick | F03G 6/00 417/379 |
| 4,458,669 | A * | 7/1984 | Lee | F24D 11/003 126/570 |
| 4,574,779 | A * | 3/1986 | Hayes | F24D 17/0021 126/641 |
| 7,798,140 | B2 * | 9/2010 | van Houten | F24D 17/0021 126/634 |
| 8,220,453 | B2 * | 7/2012 | Bourke | F24D 17/0021 126/589 |
| 2007/0107718 | A1 * | 5/2007 | Filippone | F03G 6/00 126/569 |
| 2007/0240703 | A9 * | 10/2007 | Bourke | F24D 17/0021 126/599 |
| 2009/0277444 | A1 * | 11/2009 | Lin | F04B 17/006 126/643 |
| 2011/0259321 | A1 * | 10/2011 | Lin | F24J 2/44 126/639 |

* cited by examiner

SELF-POWERED PUMP FOR HEATED LIQUID AND HEAT DRIVEN LIQUID CLOSE-LOOP AUTOMATIC CIRCULATING SYSTEM EMPLOYING SAME

FIELD OF TECHNOLOGY

The present disclosure relates to a modified self-powered pump for heated liquids. The present disclosure also relates to a heat driven liquid close-loop automotive circulating system employing modified self-powered pump.

BACKGROUND

A self-powered pump and a heat driven liquid automotive circulating system have be disclosed in a Canadian patent application (No. 02628605) and PCT/CA2009/000631. The technology and the products based on the technology operate well now. However the concept used in above patent application can be expanded into more general situations. This means that the concept of the above pending patent can be used not only for transfer the heat from a higher place to a lower place, but also can transfer the heat to the place at the same level or a higher place. This patent application reflects our R&D progress in this topic.

The disclosed heat driven liquid automotive circulating system used in a solar heating system may bring following advantages to the system.

Comparing to the existing nature circulating unit solar water heater, the new system can put solar collector on the roof while the water tank is in building.

Comparing to the existing electric power pump forced circulation solar heating system, the heat driven solar heat automotive circulating system does not need electric power pump, expansion tank and controller.

SUMMARY

Following is the summary of the self-powered pump and the heat driven liquid close-loop automotive circulating systems:

A self-powered pump for heated liquid, used with a liquid heat collector, comprising:
  an airtight container for containing heated liquid, having a wall to separate its outer and inner spaces; said inner space is filled with heated liquid partially and having a upper air/vapor space above liquid level surface and lower liquid space under liquid level surface;
  an inlet and a outlet arranged on said wall of the container that both are under the liquid level surface in said container, and said inlet not lower than said outlet;
  a breathing channel mounted on said wall of said container for connecting atmosphere with said inner upper air/vapor space above liquid level surface; said breathing channel having a liquid vapor condensing and reflux structure.

The pump of claim 1 wherein said container is a heat insulated container.

The pump of claim 1 wherein said container is a transparent container made of glass or polymeric material.

The pump of claim 1 wherein said container is an evacuated container.

The pump of claim 1 wherein said inlet and outlet of said container have a inlet pipe and outlet pipe that mounted at said inlet and said outlet; a portion of either inlet pipe or outlet pipe that extended outside said container is detachable.

The pump of claim 1 wherein said breathing channel comprising: a opening fitting on said wall of container above the said liquid level in said container; a tube having an lower end mounted on the top of the wall of said container and a upper opposite end with a removable cap; a hole on the side wall of said tube for connecting atmosphere with said inner space upper liquid level in said container; a set of vapor condensing pieces, disposed in said breathing tube for liquid vapor condensing and condensate refluxing.

The mounted upward tube according to claim 6 is a transparent tube made of glass or polymeric.

The pump of claim 1 wherein said breathing channel comprising: a opening fitting on the wall under the liquid lever in said container; a breathing tube mounted on said opening fitting under the liquid lever in said container and extended upwardly into the inner air/vapor space upper the liquid level in said container; said breathing tube having a portion outside of said container wall and with a flexural shape, for liquid vapor condensing and for condensate temporary storage and refluxing.

The pump of claim 1 wherein said heated liquid is water.

The pump of claim 1 wherein said heated liquid is a anti-freezing liquid.

A heat driven liquid close-loop automotive circulation system, comprising:
  a heat collector having a liquid vessel filled fully with heat transfer medium, which is a liquid;
  said liquid vessel having an inlet and an outlet; said outlet is not lower than said inlet;
  a self-powered pump for heated liquid which used with a liquid heat collector, comprising:
  an airtight container for containing heated liquid, having a wall to separate its outer and inner spaces; said inner space is filled with heated liquid partially and having a upper air/vapor space above liquid level surface and lower liquid space under liquid level surface;
  an inlet and a outlet arranged on said wall of the container that both are under the liquid level surface in said container, and said inlet not lower than said outlet;
  a breathing channel mounted on said wall of said container for connecting to atmosphere with said inner upper air/vapor space above liquid level surface; said breathing channel having a liquid vapor condensing and reflux structure;
  first conduit connecting its one end at said outlet of said heat collector and the opposite end at said inlet of said self-powered pump, wherein said inlet of self-powered pump is not lower than said outlet of said heat collector;
  second conduit connecting its one end at said outlet of said self-powered pump and its opposite end at said inlet of said heat collector, wherein said outlet of self-powered pump is not lower than said inlet of said heat collector; said second conduit including three continued portions that are higher, lower and the at same level respectively comparing with the location of said heat collector.

The heat collector of claim 11 is a solar heat collector.

The heat collector of claim 11 wherein said heat collector is a heat insulated heat collector.

The heat collector of claim 11 wherein said heated liquid is water.

A heat driven liquid close-loop automotive circulation system, comprising:
  a heat collector having a liquid vessel filled fully with heat transfer medium, which is a liquid;
  said liquid vessel having an inlet and an outlet; said outlet is not lower than said inlet;

a liquid heating and storage tank wherein filled with heated liquid partially; comprising:
a heated liquid level surface separating the inner space into upper air/vapor space and lower heated liquid space;
a heated liquid inlet and a heated liquid outlet, wherein both of said inlet and outlet are under the heated liquid level surface; said heated liquid inlet is not lower than said heated liquid outlet;
a breathing channel mounted on said wall of said storage tank for connecting atmosphere with said inner upper air/vapor space above liquid level; said breathing channel having a liquid vapor condensing and reflux structure;
first conduit connecting its one end at said outlet of said heat collector and the opposite end at said inlet of said liquid heating and storage tank, wherein said
inlet of said liquid heating and storage tank is not lower than said outlet of said heat collector;
Second conduit connecting its one end at said outlet of said liquid heating and storage tank and the opposite end at said inlet of said heat collector, wherein said
outlet of said liquid heating and storage tank is not higher than said inlet of said heat collector. The liquid heating and storage tank of claim 15 wherein said a breathing channel mounted on said wall of said storage tank is a connecting fitting with a mounted pressure release valve; such that the said liquid heating and storage tank is a pressure tank.
The heat collector of claim 15 wherein said heated liquid is water.
The said liquid storage tank of claim 15 wherein said breathing channel comprising: a opening fitting on said wall of said liquid heating and storage tank above the said liquid level in said liquid heating and storage tank; a tube having an lower end mounted on the top of the wall of said liquid heating and storage tank and a upper opposite end with a removable cap; a hole on the side wall of said tube for connecting atmosphere with said inner space upper liquid level in said liquid heating and storage tank; a set of vapor condensing pieces, disposed in said breathing tube for liquid vapor condensing and condensate refluxing.
The mounted upward tube according to claim 15 is a transparent tube made of glass or polymeric.
The heat collector of claim 15 is a solar heat collector.
The heated liquid of claim 15 is water.
The liquid heating and storage tank of claim 15 having a liquid inlet for cooled liquid supply, a liquid outlet for supplying heated liquid to user, a pressure release valve and a drain.
A heat driven liquid close-loop automotive circulation system, comprising:
a heat collector having a liquid vessel filled fully with heat transfer medium, which is a liquid; said liquid vessel having an inlet and an outlet; said outlet is not lower than said inlet;
a fluid heating and storage tank, comprising:
a storage tank for primary fluid, said storage tank having a primary fluid inlet, a primary fluid outlet, a secondary fluid inlet and a secondary fluid outlet; and
an apparatus, that is a self-powered pump, disposed within said storage tank for flow a secondary fluid, which is a liquid, through said storage tank in isolation from said primary fluid, said apparatus fluidly interconnecting said secondary fluid inlet with said secondary fluid outlet and comprising a heat exchanger; said apparatus having a breathing channel extended upward and mounted at the top wall of said storage tank; said breathing channel is fluidly communicated with said secondary fluid within apparatus and opened to atmosphere;
first conduit connecting its one end at said outlet of said heat collector and the opposite end at said secondary fluid inlet of fluid heating and storage tank, wherein said secondary fluid inlet of said liquid heating and storage tank is not lower than said outlet of said heat collector;
Second conduit connecting its one end at said secondary fluid outlet of said fluid heating and storage tank and the opposite end at said inlet of said heat collector, wherein said secondary fluid outlet of said fluid heating and storage tank is not higher than said inlet of said heat collector.
The fluid storage tank of claim 23 wherein said breathing channel further comprising: a tube having an lower end mounted on the top of the wall of said liquid heating and storage tank and a upper opposite end with a removable cap; a hole on the side wall of said tube for connecting atmosphere with inner air/vapor space upper secondary liquid level in said apparatus; a set of vapor condensing pieces, disposed in said breathing tube for liquid vapor condensing and condensate refluxing.
The fluid storage tank of claim 23 wherein said primary liquid is water and secondary fluid is a anti-freezing liquid.
The heat collector of claim 23 is a solar heat collector.
The fluid heating and storage tank of claim 23 having a fluid inlet for cooled fluid supply, a fluid outlet for supplying heated fluid to user, a pressure release valve and a drain.
A heat driven liquid close-loop automotive circulation system, comprising:
a heat collector having a liquid vessel filled fully with heat transfer medium, which is a liquid; said liquid vessel having an inlet and an outlet; said outlet is not lower than said inlet;
a self-powered pump for heated liquid, comprising:
an airtight container for containing heated secondary fluid, which is a liquid, having a wall to separate its outer and inner spaces; said inner space is filled with heated secondary liquid partially and having a upper air/vapor space above liquid level surface and lower liquid space under liquid level surface;
an inlet and a outlet arranged on said wall of the container that both are under the secondary liquid level surface in said container, and said inlet not lower than said outlet;
a breathing channel mounted on said wall of said container for connecting to atmosphere with said inner upper air/vapor space above liquid level surface; said breathing channel having a liquid vapor condensing and reflux structure,
a fluid heating and storage tank, comprising:
a storage tank for primary fluid, said storage tank having a primary fluid inlet, a primary fluid outlet, a secondary fluid inlet and a secondary fluid outlet; and
an apparatus disposed within said storage tank for flow a secondary fluid, which is a liquid, through said storage tank in isolation from said primary fluid, said apparatus fluidly interconnecting said secondary fluid inlet with said secondary fluid outlet and comprising a heat exchanger; wherein said secondary fluid inlet of said fluid heating and storage tank is not lower than said secondary fluid outlet of said fluid heating and storage tank;
first conduit connecting its one end at said outlet of said heat collector and the opposite end at said secondary liquid inlet of said self-powered pump, wherein said outlet of said heat collector is not higher than said secondary fluid inlet of self-powered pump;

second conduit connecting its one end at said secondary fluid outlet of said self-powered pump and the opposite end at said secondary fluid inlet of said fluid heating and storage tank, wherein said secondary fluid outlet of said self-powered pump is not lower than said secondary fluid inlet of said fluid heating and storage tank;

third conduit connecting its one end at said secondary fluid outlet of said fluid heating and storage tank, and the opposite end at said inlet of said heat collector, wherein said secondary fluid outlet of said fluid heating and storage tank is not higher than said inlet of said heat collector.

The heat collector of claim 28 is a solar heat collector.
the heat storage tank of claim 28 wherein said primary fluid is water and said secondary liquid is a anti-freezing liquid.
The fluid heating and storage tank of claim 28 having a fluid inlet for cooled fluid supply, a fluid outlet for supplying heated fluid to user, a pressure release valve and a drain.
A heat driven liquid close-loop automotive circulation system, comprising:

a heat collector having a liquid vessel filled fully with heat transfer medium, which is a liquid; said liquid vessel having an inlet and an outlet; said outlet is not lower than said inlet;

a self-powered pump for heated liquid, comprising:

an airtight container for containing heated secondary fluid, which is a liquid, having a wall to separate its outer and inner spaces; said inner space is filled with heated secondary liquid partially and having a upper air/vapor space above liquid level surface and lower liquid space under liquid level surface;

an inlet and a outlet arranged on said wall of the container that both are under the secondary liquid level surface in said container, and said inlet not lower than said outlet;

a breathing channel mounted on said wall of said container for connecting to atmosphere with said inner upper air/vapor space above liquid level surface; said breathing channel having a liquid vapor condensing and reflux structure, a heat exchanger, comprising:

a fluid reservoir for primary fluid, said reservoir having a primary fluid inlet, a primary fluid outlet, a secondary fluid inlet and a secondary fluid outlet; and an apparatus disposed within said reservoir for flow a secondary fluid, which is a liquid, through said reservoir in isolation from said primary fluid, said apparatus fluidly interconnecting said secondary fluid inlet with said secondary fluid outlet; wherein said secondary fluid inlet of said heat exchanger is not lower than said secondary fluid outlet of said heat exchanger;

first conduit connecting its one end at said outlet of said heat collector and the opposite end at said secondary liquid inlet of said self-powered pump, wherein said outlet of said heat collector is not higher than said secondary fluid inlet of self-powered pump;

second conduit connecting its one end at said secondary fluid outlet of said self-powered pump and the opposite end at said secondary fluid inlet of said heat exchanger, wherein said secondary fluid outlet of said self-powered pump is not lower than said secondary fluid inlet of said heat exchanger;

third conduit connecting its one end at said secondary fluid outlet of said heat exchanger, and the opposite end at said inlet of said heat collector, wherein said secondary fluid outlet of said heat exchanger is not higher than said inlet of said heat collector.

The heat collector of claim 32 is a solar heat collector.
The heat exchanger of claim 32 wherein said primary fluid is water and said secondary liquid is a anti-freezing liquid.

BRIEF DESCRIPTION OF THE DRAWINGS

In the figures which illustrate exemplary embodiments of this invention.

DETAILED DESCRIPTION

Figure 1:
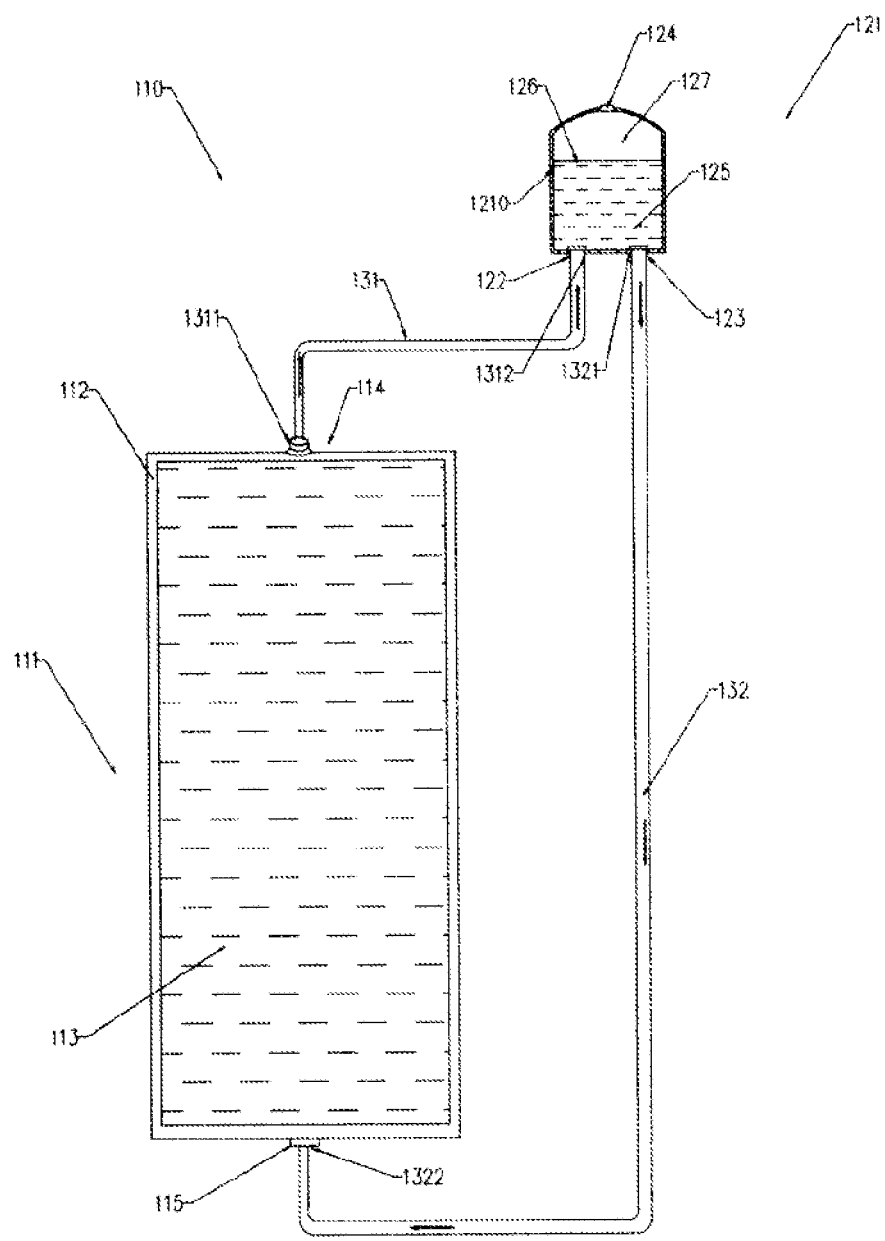
FIG. 1 is schematic diagram illustrating a simple heat driven liquid close-loop automotive circulation system.

Referring to FIG. 1, an exemplary heat driven liquid close-loop automotive circulating system is illustrated during use. The system 110 includes a heat collector 111 having a vessel 112 filled fully with heat transfer medium, which is a liquid 113; said vessel having an inlet 115 and an outlet 114; said outlet 114 is not lower than said inlet 115.

A self-powered pump 121 for heated liquid which used with a liquid heat collector 111. The self-powered pump 121 has an airtight container 1210 for containing heated liquid, having a wall to separate its outer and inner spaces. The inner space is filled with heated liquid partially, so that there is a upper air/vapor space 127 above liquid level surface 126 and lower liquid space 125 under liquid level surface 126. An inlet 122 and a outlet 123 arranged on said wall of the container that both are under the liquid level surface 126 in said container, and the inlet 122 is not lower than said outlet 123.

A breathing channel 124 mounted on said wall of said container 121 for connecting to atmosphere with said inner upper air/vapor space 127 above liquid level surface 126; said breathing channel 124 has a liquid vapor condensing and reflux structure that will be explained in FIG. 2 and FIG. 3.

First conduit 131 connects its one end 1311 at the outlet 114 of the heat collector 111. The opposite end of conduit 131 connects at the inlet 122 of the self-powered pump 121. The inlet 122 of self-powered pump 121 is not lower than the outlet 114 of said heat collector 111. This is for the heat driven liquid move upwardly to the self-powered pump 121.

Second conduit 132 connects its one end 1321 at said outlet 123 of said self-powered pump 121 and its opposite end 1322 at said inlet 115 of said heat collector 121, The outlet 123 of self-powered pump 121 is not lower than the inlet 115 of said heat collector 111. FIG. 1 shows that the second conduit 132 has its top portion higher than the heat collector 111 and the lower portion lower than the heat collector 111 and its middle portion is as high as the level of the heat collector 111 located.

In FIG. 1, the heat collector 111, conduit 131, self-powered pump 121 and conduit 132 are formed a heated liquid close-loop circuit. When the heat collector 111 received the heat, the heated liquid tends to move upwardly and the cooler liquid in the opposite direction. The heated liquid moves to the self-power pump 121 and the cooler liquid in the bottom of heat collector 111 and conduit 132 comes and replenishes the space. So that a circulating power is generated in the system 110 and make the system operation continuously when the heat is available.

This example circuit shows that by employing a self-powered pump at the upper place of the heat collector. It is possible to form a close loop circuit. In this circuit a heater can transfer its heat to the places whatever is higher, lower or the same level of the heater without external power pump.

Figure 2:
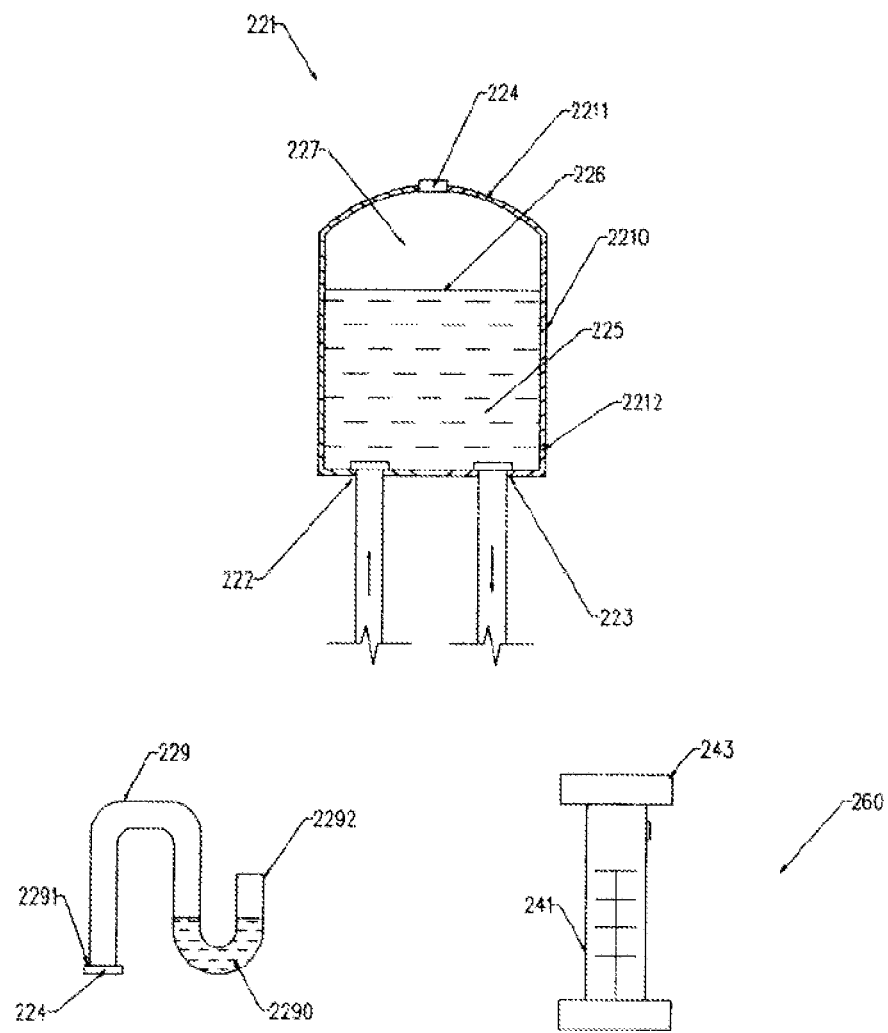
FIG. 2 is schematic diagram illustrating the self-powered pump of FIG. 1 with a breathing channel at the top of pump.

Referring to FIG. 2, an exemplary a self-powered pump 221 for heated liquid is illustrated during use. This pump includes an airtight container 2210 for containing heated liquid, having a wall 2211 to separate its outer and inner spaces; The inner space is filled with heated liquid partially and having a upper air/vapor space 227 above liquid level surface 226 and a lower liquid space 225 under liquid level surface 226.

An inlet 222 and an outlet 223 meant for connecting with the reflux structure 229, or a top outlet 224 meant for connecting with the reflux structure 260 are arranged on said wall 2211 of the container 2210 that both are under the liquid level surface 226 in said container 2210, and said inlet 222 not lower than said outlet 223. A part 224 of breathing channel is a connecting fitting mounted on said wall 2211 of said container 221 for connecting atmosphere with the inner upper air/vapor space 227 above liquid level surface 226. The breathing channel having a liquid vapor condensing and reflux structure 229 or 260 is mounted on the fitting of 224. The part 229 is a "N" shape tube. When the liquid vapor from container 2210 may be condensed in the tube 229 and the condensate may be temporary stored at the inner lower poison 2290. When the liquid in self-powered pump is cooled, the negative pressure may draw the condensate back to the container 2210, So that the liquid in the close-loop may be kept. This is also a channel to add the liquid to the close-loop circuit when the end 2292 of the tube 229 is higher.

The liquid vapor condensing and reflux structure 260 is another kind of structure that mounted on the fitting of 224. This is a transparent tube 241 with a cup 243. A hole 224 on the wall of the tube 241 is for connecting space 227 with atmosphere. A set of vapor condensing pieces, e.g. copper pieces, are disposed in the breathing tube 241 for liquid vapor condensing and condensate refluxing to the container.

Figure 3:
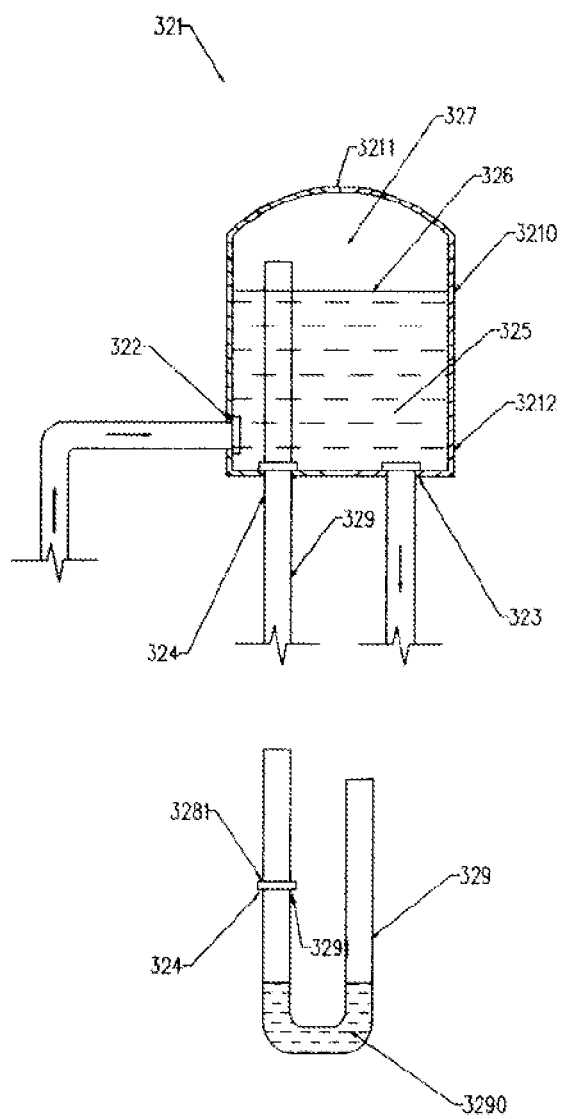
FIG. 3 is schematic diagram illustrating the self-powered pump of FIG. 1 with another breathing channel structure.

Referring to FIG. 3, an exemplary another kind of self-power pump 321 is illustrated during use. An airtight container 3210 for containing heated liquid, having a wall 3211 to separate its outer and inner spaces. The inner space is filled with heated liquid partially and having a upper air/vapor space 327 above liquid level surface 326 and lower liquid space 325 under liquid level surface 326. An inlet 322 and a outlet 323 are arranged on said wall 3211 of the container 3210. They both are under the liquid level surface 326. The inlet 322 is not lower than outlet 323.

A breathing channel 324 mounted on said wall of said container for connecting atmosphere with said inner upper air/vapor space 327 above liquid level surface 326. The breathing channel has a liquid vapor condensing and reflux structure. It includes a opening fitting on the wall under the liquid lever 326 in said container. A breathing tube 329 mounted on said opening fitting under the liquid lever 326 in said container and extended upwardly into the inner air/vapor space 327 that upper the liquid level 326 in said container. The breathing tube 329 has a portion 3290 outside of said container wall and with a flexural shape, e.g. U shape. It is for liquid vapor condensing and for condensate 3290 temporary storage and refluxing as explained in FIG. 2.

Figure 4:
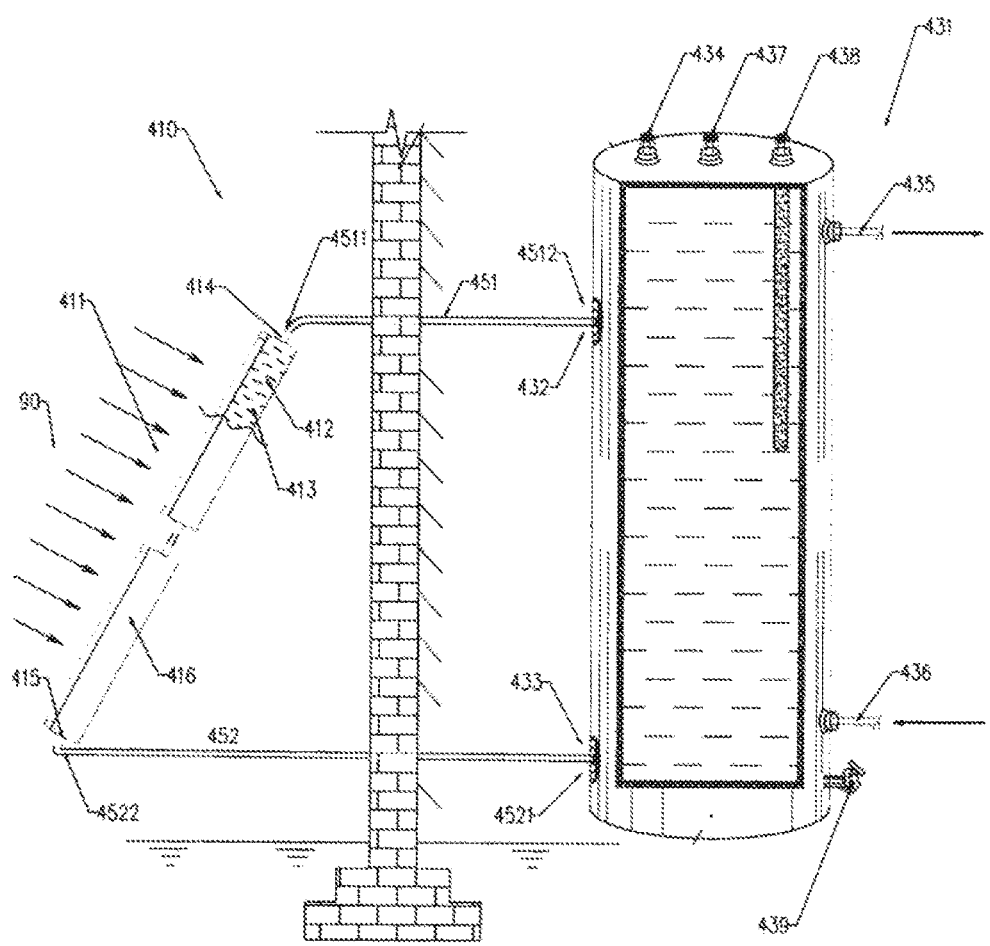
FIG. 4 is schematic diagram illustrating a heat driven liquid close-loop automotive circulation system without heat exchanger.

Referring to FIG. 4, an exemplary a heat driven liquid close-loop automotive circulating system is illustrated during use. This system includes a heat collector 411, a liquid heating and storage tank 431 and the connecting conduits 451 and 452. The heat collector 411 combines two solar heat collectors 412 and 416. The heat collector has a liquid vessel 412 filled fully with heat transfer medium, which is a liquid 413. The vessel has an inlet 415 and an outlet 414. The outlet 414 is not lower than said inlet 415.

A liquid heating and storage tank 431 is filled with heated liquid partially. In the tank has a heated liquid inlet 432 and a heated liquid outlet 433. Both of them are under the heated liquid level surface. The heated liquid inlet 432 is not lower than the heated liquid outlet 433. a breathing channel 437 mounted on the wall of said storage tank for connecting atmosphere with said inner upper air/vapor space above liquid level. The breathing channel has a liquid vapor condensing and reflux structure as explained in FIGS. 2 and 3. First conduit 451 connects its one end 4511 at the outlet 414 of the heat collector 411 and the opposite end 4512 at the inlet 432 of the liquid heating and storage tank 431. The inlet 432 is not lower than the out let 414 of the heat collector. Second conduit 452 connects its one end 4521 at the outlet 433 of said liquid heating and storage tank and the opposite end 4522 at the inlet 415 of the heat collector. The outlet 433 of said liquid heating and storage tank 431 is not higher than the inlet 415 of said heat collector 411.

In FIG. 4, the heat collector 411, conduit 451, storage tank 431 and conduit 452 are formed a heated liquid close-loop circuit. When the solar heat collector 411 received the solar heat, the heated liquid tends to move upwardly and the cooler liquid in the opposite direction. The heated liquid, it is water, moves to the storage tank 431 and the cooler liquid in the bottom of heat collector 411 and conduit 452 comes and replenishes the space. So that a circulating power is generated in the system 410 and make the system operate continuously when the heat is available.

In some case, a release valve that mounted at the fitting on the storage tank 431 can replace the breathing channel 437. In this case the storage tank 431 becomes a pressured storage tank. The release valve may become a breathing channel. The heat transfer speed of this kind of pressured tank is not as good as an opened tank. Further more, there is a concern of the safety for frequent on/off release valve. One of the solutions is to add a release valve at the fitting 434 at different start pressure setting value.

The storage tank has cool liquid inlet 436, hot liquid outlet 435, drain 439 and protective anode 438 as normal tank.

Figure 5:
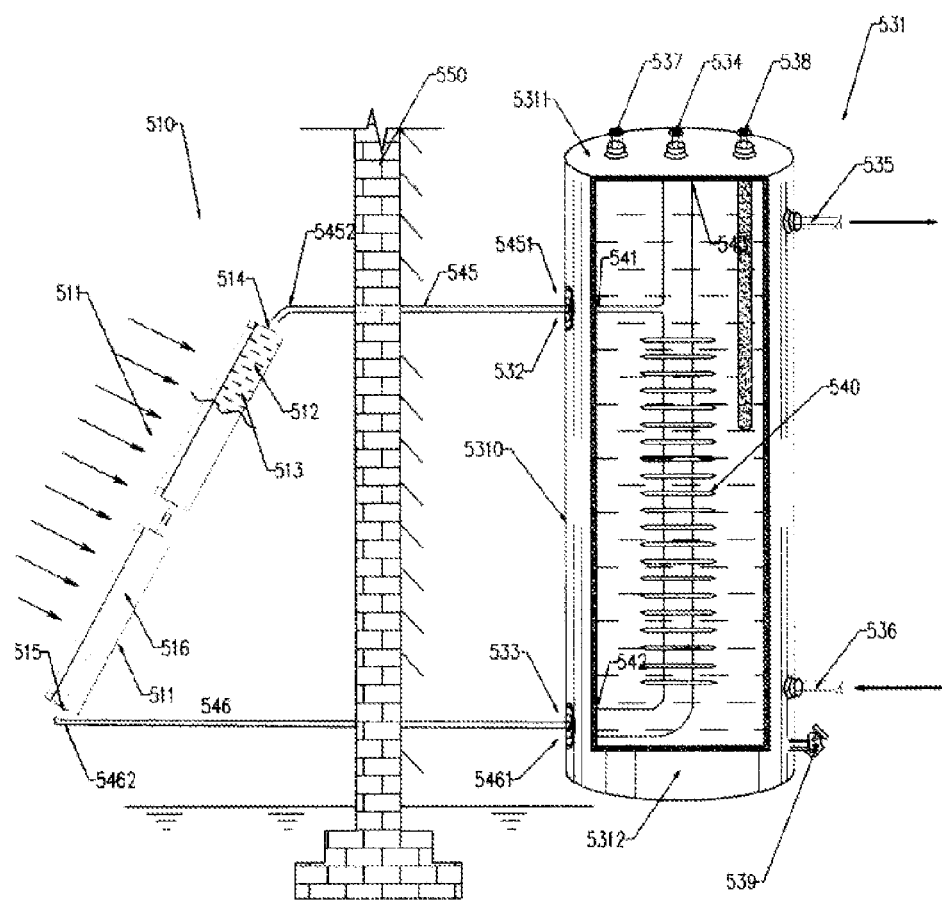
FIG. 5 is schematic diagram illustrating a heat driven liquid close-loop automotive circulation system with a heat exchanger opened to atmosphere.

Referring to FIG. 5, an exemplary a heat driven liquid close-loop automotive circulating system 510 is illustrated during use. In this case, a solar heat collector is arranged in a place out of the building wall 550 and the heat storage tank 531 in seats in the room for freezing protection. A heat collector 510 has its liquid vessel 513 filled fully with heat transfer medium, which is a liquid. This liquid vessel 513 has an inlet 515 and an outlet 514. The outlet 514 is not lower than the inlet 515.

A fluid heating and storage tank 531 has a storage tank for primary fluid. The storage tank has a primary fluid, it is water, inlet 536, a primary fluid outlet 535, a secondary fluid inlet 541 and a secondary fluid outlet 542. The storage tank also has an apparatus 540 disposed within the storage tank 531 for flow a secondary fluid, which is a liquid, through the storage tank in isolation from the primary fluid, The apparatus fluidly interconnects the secondary fluid inlet 532 with the secondary fluid outlet 533 and comprising a heat exchanger 540. The apparatus 540 has a breathing channel extended upward and mounted at the top wall 5311 of the storage tank 531. The breathing channel is fluidly communicated with the secondary fluid within apparatus and opened to atmosphere.

First conduit 545 connects its one end at the outlet 5452 of a heat collector 511 and the opposite end 5451 at the secondary fluid inlet 532 of fluid heating and storage tank 531. The secondary fluid inlet 532 of said liquid heating and storage tank 531 is not lower than the outlet of the heat collector 511. Second conduit 546 connects its one end 5461 at said secondary fluid outlet 533 of the fluid heating and storage tank 531 and the opposite end 5462 at the inlet of the heat collector 511. The secondary fluid outlet 533 of the fluid heating and storage tank 511 is not higher than the inlet 515 of the solar heat collector.

In FIG. 5, the heat collector 511, conduit 545, the apparatus 540 in the storage tank 531 and conduit 446 are formed a heated liquid close-loop circuit. When the solar heat collector 511 receives the solar heat, the heated liquid tends to move upwardly and the cooler liquid in the opposite direction. The heated liquid moves to the apparatus 540 in the storage tank 531 and the cooler liquid in the bottom of heat collector 511 and conduit 546 comes and replenishes the space. So that a circulating power is generated in the system 510 and make the system operate continuously when the heat is available. The apparatus (it is a fin tube in this example) transfer the heat in heated secondary liquid to primary fluid in the tank and the cooled secondary liquid returns to the solar hat collector. A heat transfer processing is completed. In this case, even the close-loop circuit is opened, but the primary fluid circuit is closed and pressured.

The storage tank 531 has cool liquid inlet 536, hot liquid outlet 535, drain 539 and protective anode 538 as normal tank.

Figure 6:
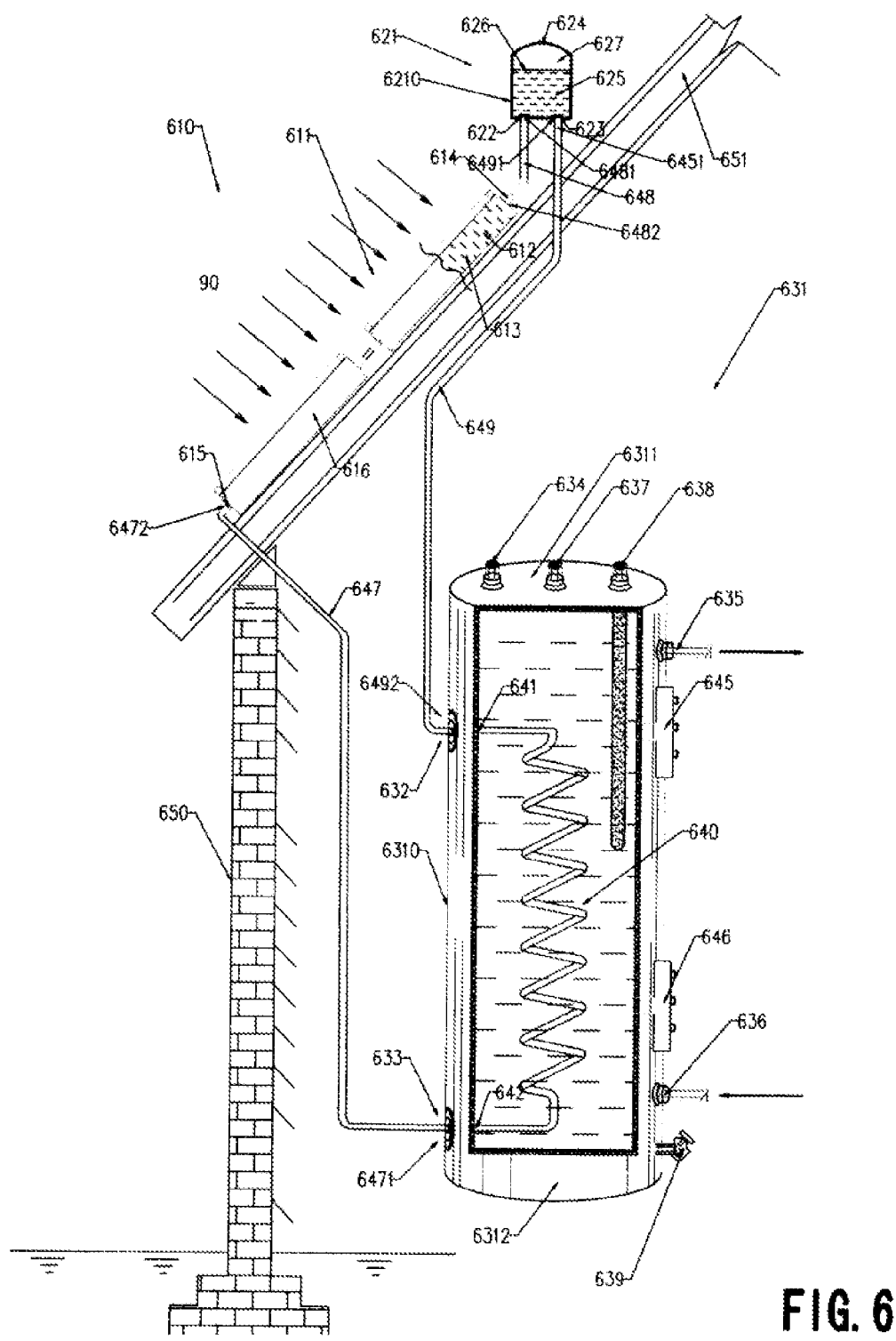
FIG. 6 and FIG. 7 are schematic diagram illustrating two heat driven liquid close-loop automotive circulation systems when the relevant locations between solar heater collector and heat storage tank.

Referring to FIG. 6, an exemplary heat driven liquid close-loop automotive circulating system 610 is illustrated during use. In this case a self-powered pump 621 is used and the solar heat collector is installed in a roof 651 of a building.

This system includes a solar heat collector 611, a self-powered pump 621 and a storage tank 631 with a heat exchanger 640 and connecting conduits.

The solar heat collector 611 has a liquid vessel 613 filled fully with heat transfer medium, which is a liquid. The liquid vessel 613 has an inlet 615 and an outlet 614. The outlet 614 is not lower than said inlet 615.

The self-powered pump 621 for heated liquid, has an airtight container 6210 for containing heated secondary fluid, which is a anti-freezing liquid. The pump 621 has a wall to separate its outer and inner spaces. The inner space is filled with heated secondary liquid partially and has a upper air/vapor space 627 above liquid level surface 626 and lower liquid space 625 under liquid level surface 626.

An inlet 622 and a outlet 623 are arranged on said wall of the container. Both inlet 622 and outlet 623 are under the secondary liquid level surface 626 in said container 6210. The inlet 622 is not lower than the outlet 623. A breathing channel 624 mounted on said wall of said container for connecting atmosphere with the inner upper air/vapor space 627 above liquid level surface 626. The breathing channel 624 has a liquid vapor condensing and reflux structure that is not shown in this Fig. The detailed structure of the breathing channel has discussed in details in FIGS. 2 and 3.

The fluid heating and storage tank 631 has a storage tank 6312 for primary fluid. The storage tank 631 has a primary fluid inlet 636, a primary fluid outlet 635, a secondary fluid inlet 632 and a secondary fluid outlet 633 and an apparatus 640 disposed within the storage tank 631 for flow a secondary fluid, which is a anti-free liquid, through the storage tank 631 in isolation from said primary fluid. The apparatus 640 fluidly interconnect the secondary fluid inlet 632 with the secondary fluid outlet and comprising a heat exchanger; wherein said secondary fluid inlet 632 of the fluid heating and storage tank is not lower than said secondary fluid outlet 633 of said fluid heating and storage tank 631.

First conduit 648 connects its one end 6482 at the outlet 614 of the heat collector 611 and the opposite end 6481 at the secondary liquid inlet 622 of said self-powered pump 621. The outlet 615 of the heat collector 611 is not higher than the secondary fluid inlet 622 of the self-powered pump 621. Second conduit 649 connects its one end 6451 at the secondary fluid outlet 623 of the self-powered pump 521 and the opposite end 6492 at said secondary fluid inlet 632 of said fluid heating and storage tank 631. The secondary fluid outlet 623 of the self-powered pump 621 is not lower than the secondary fluid inlet 632 of the fluid heating and storage tank 631. Third conduit 647 connects its one end 6471 at the secondary fluid outlet 633 of the fluid heating and storage tank 631 and its opposite end 6472 at the inlet 615 of the solar heat collector 611. The secondary fluid outlet 622 of the fluid heating and storage tank 631 is not higher than the inlet 615 of the heat collector 611.

In FIG. 6, the heat collector 611, conduit 648, self-power pump 621, conduit 649, storage tank 631 and conduit 647 are formed a heated liquid close-loop circuit. When the solar heat collector 611 received the solar heat, the heated liquid tends to move upwardly and the cooler liquid in the opposite direction. The heated liquid, it is water, moves to the storage tank 631 and the cooler liquid in the bottom of heat collector 611 and conduit 647 comes and replenishes the space. So that a circulating power is generated in the system 610 and make the system operate continuously when the heat is available.

Figure 7:
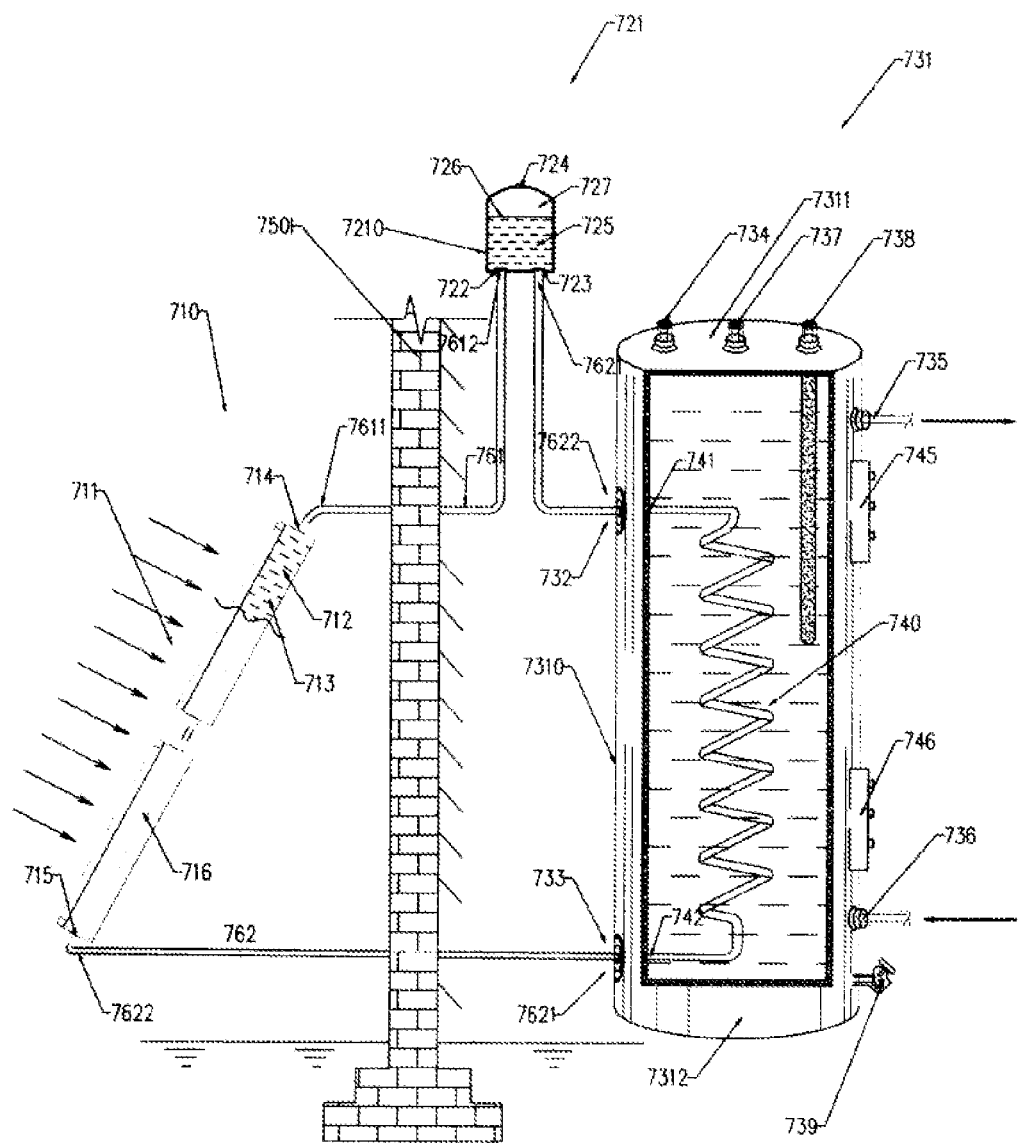

Referring to FIG. 7, an exemplary a heat driven liquid close-loop automotive circulating system 710 is illustrated during use. Comparing FIG. 7 with FIG. 6, The difference is a building wall 7501 replaces the building roof 651. In FIG. 6 the heat receiver 610 is higher than the storage tank 631, but in FIG. 7, the heat receiver 710 has the same height with the storage tank 731. The tank 731 has electric heaters 745 and 746 that are the optional components did not show in every system.

It is easy to understand the system and how it works, if compare FIG. 7 with FIG. 6. So that there is no more explanation is required.

Figure 8:
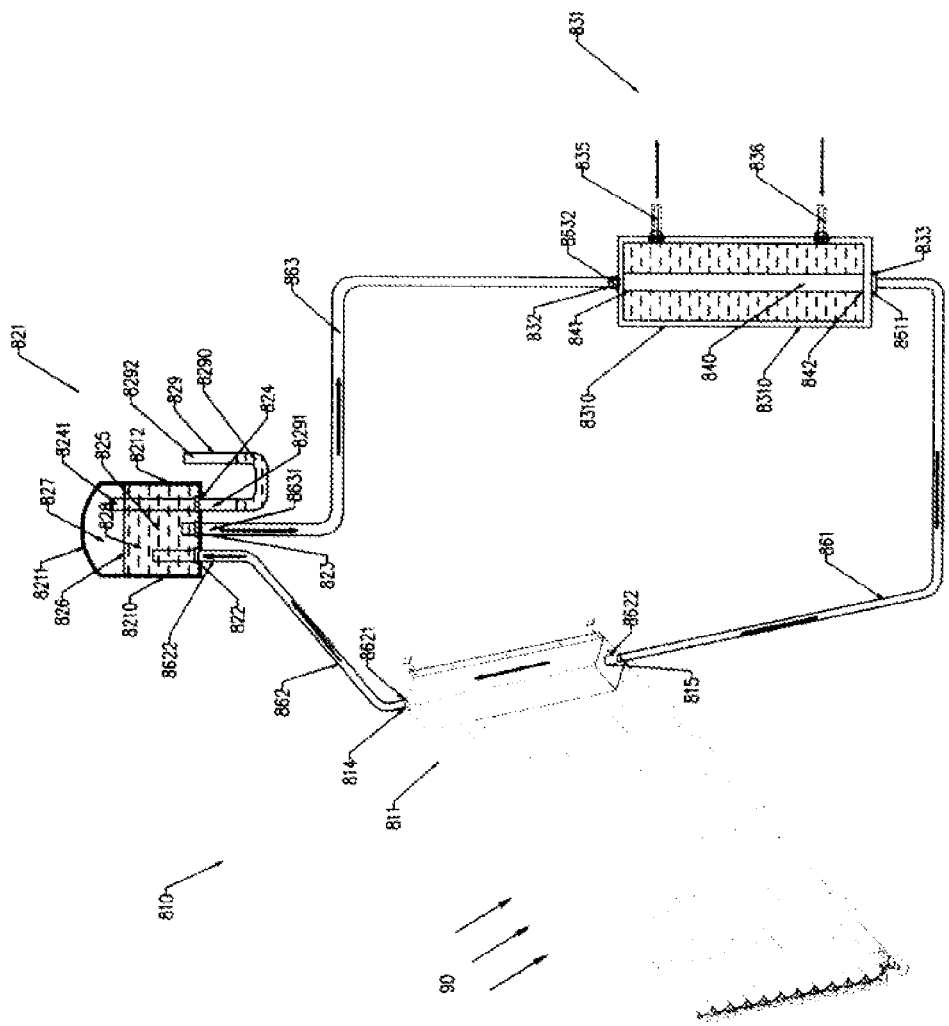
FIG. 8 is a is schematic diagram illustrating a heat driven liquid close-loop automotive circulation system with a heat exchanger.

Referring to FIG. 8, an exemplary heat driven liquid close-loop automotive circulating system 810 is illustrated during use. This system includes a heat exchanger and without a heat storage tank. It is for the engineering case wherein the heat storage tank has no a internal installed heat exchanger.

This system includes a heat collector 811, a self-powered pump 821, a heat exchanger 831 and connecting conduit 861, 862 and 863.

A heat collector 811 has a liquid vessel in the insulation and did not show in FIG. 8. The liquid vessel is filled fully with heat transfer medium, which is a anti-freezing liquid. The said liquid vessel has an inlet 815 and an outlet 814. The outlet 814 is not lower than the inlet 815.

A self-powered pump 821 is as discussed before. It has a breathing channel as discussed in FIG. 3.

A heat exchanger includes following components: A fluid reservoir 8310 is for primary fluid. The reservoir 8310 has a primary fluid inlet 841, a primary fluid outlet 842, a secondary fluid inlet 832 and a secondary fluid outlet 833. An apparatus 840 is disposed within reservoir 8310 for flow a secondary fluid, which is a liquid, through the reservoir 8310 in isolation from the primary fluid. This apparatus fluidly interconnects secondary fluid inlet 832 with said secondary fluid outlet 833. The secondary fluid inlet 841 of said heat exchanger 831 is not lower than the secondary fluid outlet 842 of the heat exchanger.

First conduit 862, second conduit 863 and third conduit 861 connect the solar heat collector 811, self-powered pump 821 and the heat exchanger 831 to form a heat driven close-loop liquid flow circuit. For the reasons mentioned in FIG. 6, there is a heat driven power to circulate the secondary liquid and transfer the heat from solar heat collector 811 to the primary fluid within heat exchanger 831.

From above discussions, we can find that there is a possibility to circulate the heated liquid in a close-loop circuit without external power and pump. The heat received in heat collector can be transferred to a place where is higher, lower or the sane height comparing with the location of the heat collector. In the thermal industry, especially in solar hot water industry above results are desired.

Other modifications will be apparent to those skilled in the art and, therefore, the invention is defined in the claims.

What is claimed is:

1. A heat driven liquid self-circulating system, comprises:
   a heat collector having a heat collector inlet and a heat collector outlet; said heat collector outlet is not lower than said heat collector inlet;
   a heat driven self-circulating device for heated liquid, used with said liquid heat collector, comprising:
      an container/liquid tank for containing heated liquid, having a upper space above said heated liquid's level surface;
      an heated liquid inlet and a heated liquid outlet arranged on said airtight container/liquid tank, wherein said heated liquid outlet is under the liquid level surface, and said heated liquid inlet is not lower than said heated liquid outlet; and
      a breathing channel always connecting atmosphere with said upper air/vapor space, wherein said breathing channel has a liquid vapor condensing and refluxing structure; and
   a first connecting conduit connecting to said heat collector outlet and said heated liquid inlet, wherein said heated liquid inlet is not lower than the heat collector outlet;
   wherein said heat collector is a solar heat collector.

2. The heat driven liquid self-circulating system, according to claim 1, further comprises:
   a second conduit connecting its one end at said heated liquid outlet of said self-circulating device, which is a heated liquid self-powered pump, and its opposite end at said heat collector inlet, said second conduit including three continued portions that are higher, lower and at the same level respectively comparing with the location of said heat collector.

3. The heat driven liquid self-circulating system, according to claim 1, further comprises:
   a second conduit connecting to said heated liquid outlet and said heat collector inlet, and
   a fluid inlet and a fluid outlet arranged on a wall of said airtight container/liquid tank.

4. The heat driven liquid self-circulating system according to claim 1, further comprises:
   a second conduit connecting its one end at said heated liquid outlet and its opposite end at said heat collector inlet;
   wherein said airtight container/liquid tank is a fluid storage tank, further comprises,
   a primary fluid inlet on said airtight container/liquid tank;
   a primary fluid outlet on said airtight container/liquid tank;
   an apparatus disposed within said storage tank for flowing a secondary fluid, which is said heated liquid, through said storage tank in isolation from said primary fluid, and said apparatus fluidly interconnecting said secondary fluid inlet with said secondary fluid outlet, and comprising a heat exchanger;
   said breathing channel fluidly communicated with said secondary fluid within said apparatus.

5. The heat driven liquid self-circulating system, according to claim 1, further comprises:
   a fluid storage tank, comprising:
      a storage tank for primary fluid, said storage tank having a primary fluid inlet, a primary fluid outlet, a heated liquid inlet and a heated liquid outlet; and
      an apparatus disposed within said storage tank for flowing said heated liquid, which is secondary fluid, through said storage tank in isolation from said primary fluid, said apparatus fluidly interconnecting said heated liquid inlet with said heated liquid outlet and comprising a heat exchanger; wherein said heated liquid inlet of said fluid storage tank is not lower than said heated liquid outlet of said fluid storage tank;
   a second conduit connecting its one end at said heated liquid outlet of said heat driven self-circulating device, which is self-powered pump, and an opposite end at said heated liquid inlet of said fluid storage tank, wherein said heated liquid outlet of said self-powered pump is not lower than said heated liquid inlet of said fluid storage tank;
   a third conduit connecting its one end at said heated liquid outlet of said fluid storage tank, and an opposite end at said inlet of said heat collector.

6. The heat driven liquid self-circulating system, according to claim 1, further comprises:
   a heat exchanger, comprising:
      a fluid reservoir for primary fluid, said reservoir having a primary fluid inlet, a primary fluid outlet, a heated liquid inlet and a heated liquid outlet; and
      an apparatus disposed within said reservoir for flowing said heated liquid, which is secondary liquid, through said reservoir in isolation from said primary fluid, said apparatus fluidly interconnecting said heated liquid inlet with said heated liquid outlet; wherein said heated liquid inlet of said heat exchanger is not lower than said heated liquid outlet of said heat exchanger;
   a second conduit connecting its one end at said heated liquid outlet of said heat driven self-circulating device, which is heated liquid self-powered pump, and the opposite end at said heated liquid inlet of said heat exchanger, wherein said heated liquid outlet of said self-powered pump is not lower than said heated liquid inlet of said heat exchanger;

a third conduit connecting its one end at said heated liquid outlet of said heat exchanger, and the opposite end at said inlet of said heat collector.

7. The heat driven liquid self-circulating system according to claim 1, wherein said airtight container/liquid tank is selected from a group of:

a heat insulated container, a transparent container, and an evacuated container.

8. The heat driven self-circulating system according to claim 1, wherein said breathing channel comprising a fitting selected from a group of:

a breathing fitting mounted on said airtight container/liquid tank above said liquid level; and an breathing fitting mounted on said container under the liquid level, wherein said breathing fitting further comprises a breathing tube extended upwardly into upper space in said airtight container/liquid tank.

9. The heat driven self-circulating system according to claim 1, wherein said liquid vapor condensing and refluxing structure is selected from a group of:

a breathing fitting, a tube connected to said breathing channel, a tube having an lower end mounted on the breathing fitting of said container and a upper opposite end with a removable cup, a hall on the side wall of said tube for connecting atmosphere with said inner space upper liquid level in said container; a set of metal vapor condensing pieces disposed in said breathing tube for liquid vapor condensing and condensate refluxing;

a flexural pipe having its first end mounted at the breathing fitting of the airtight container/liquid tank and its second end higher than the first end and the liquid surface level;

an condensing airtight container/liquid tank for containing escaped heated liquid and vapor from said airtight container/liquid tank, said condensing airtight container having a inner tool for condensing the liquid vapor and a upper port open to atmosphere.

10. The heat driven liquid self-circulating system according to claim 1, wherein said heat collector is alternately a heat insulated heat collector.

11. The heat driven liquid self-circulating system according to claim 1, wherein said heat driven self-circulating device, further comprises one or more selected from the group of:

a fluid inlet, a fluid outlet, a electric heater and a drain.

12. The heat driven liquid self-circulating system according to claim 1, further comprising:

a second conduit connecting said heated liquid outlet and said heat collector inlet.

* * * * *